United States Patent [19]
Ross

[11] 3,731,567
[45] May 8, 1973

[54] METHOD AND A MACHINE FOR CUTTING OPEN ENDED OR BLIND CAVITIES

[76] Inventor: Cray L. Ross, 309 Jackson Road, Enfield, Conn. 06082

[22] Filed: Oct. 21, 1971

[21] Appl. No.: 191,383

[52] U.S. Cl. .......................... 83/1, 53/183, 83/171, 83/56, 83/286, 83/662, 425/298
[51] Int. Cl. ............................................. B26d 3/00
[58] Field of Search ................ 219/221, 29; 53/183; 83/1, 29, 15, 284, 286, 318, 662, 171, 56; 425/298

[56] References Cited

UNITED STATES PATENTS

| 3,540,336 | 11/1970 | Kelsey | 83/171 |
| 3,117,211 | 1/1964 | Tansey | 83/171 |
| 3,459,083 | 8/1969 | Bennis | 83/171 |
| 2,749,608 | 6/1956 | Siemer | 83/171 X |
| 2,464,718 | 3/1949 | Potter et al. | 83/171 X |

Primary Examiner—Andrew R. Juhasz
Assistant Examiner—W. Donald Bray
Attorney—Frederick W. Turnbull

[57] ABSTRACT

A method and a machine for cutting open ended or blind cavities in a block of material to fit merchandise having an irregular shape, by using a heated wire die to be inserted into, move laterally within and removed from block of the material.

6 Claims, 7 Drawing Figures

PATENTED MAY 8 1973
3,731,567
SHEET 1 OF 2
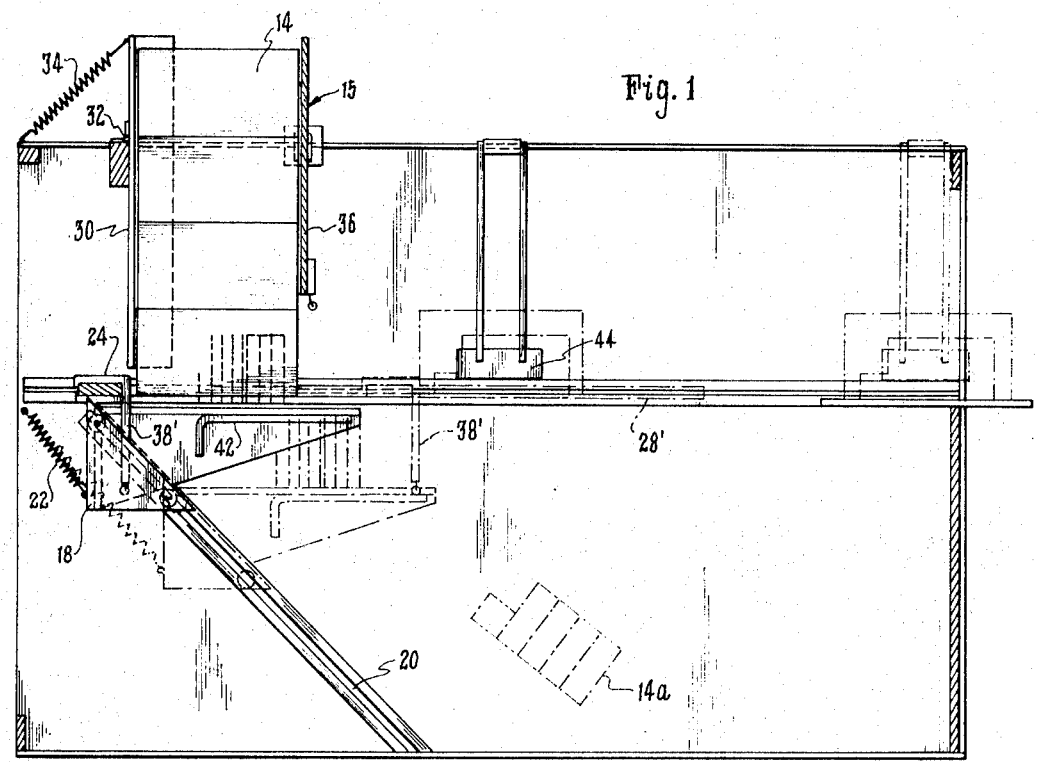
Fig. 1
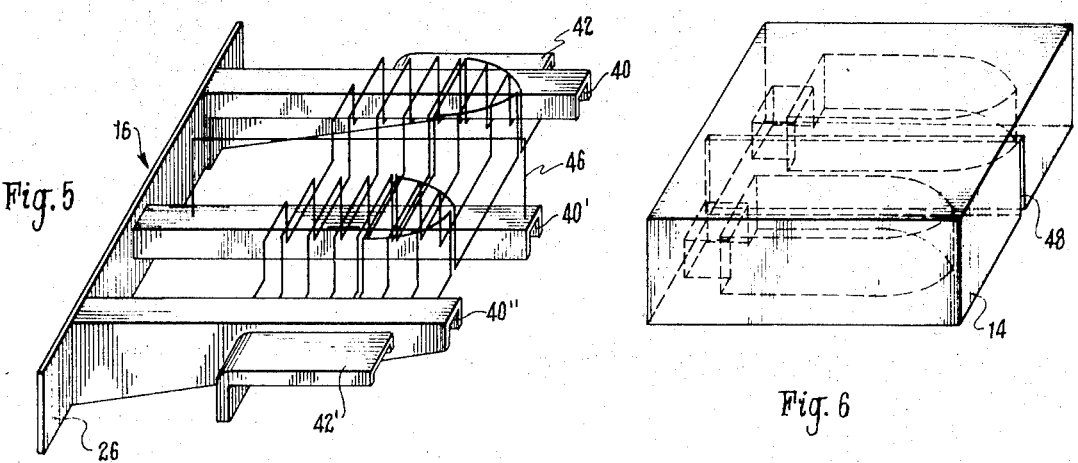
Fig. 5
Fig. 6
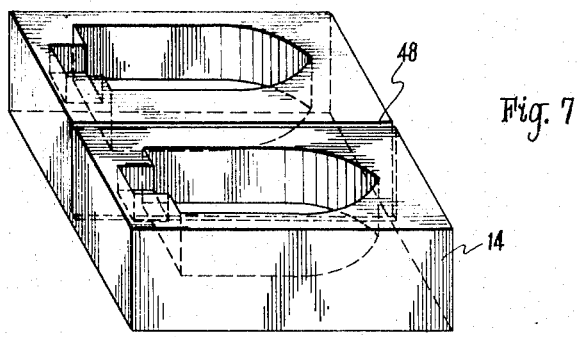
Fig. 7
INVENTOR
Cray L. Ross

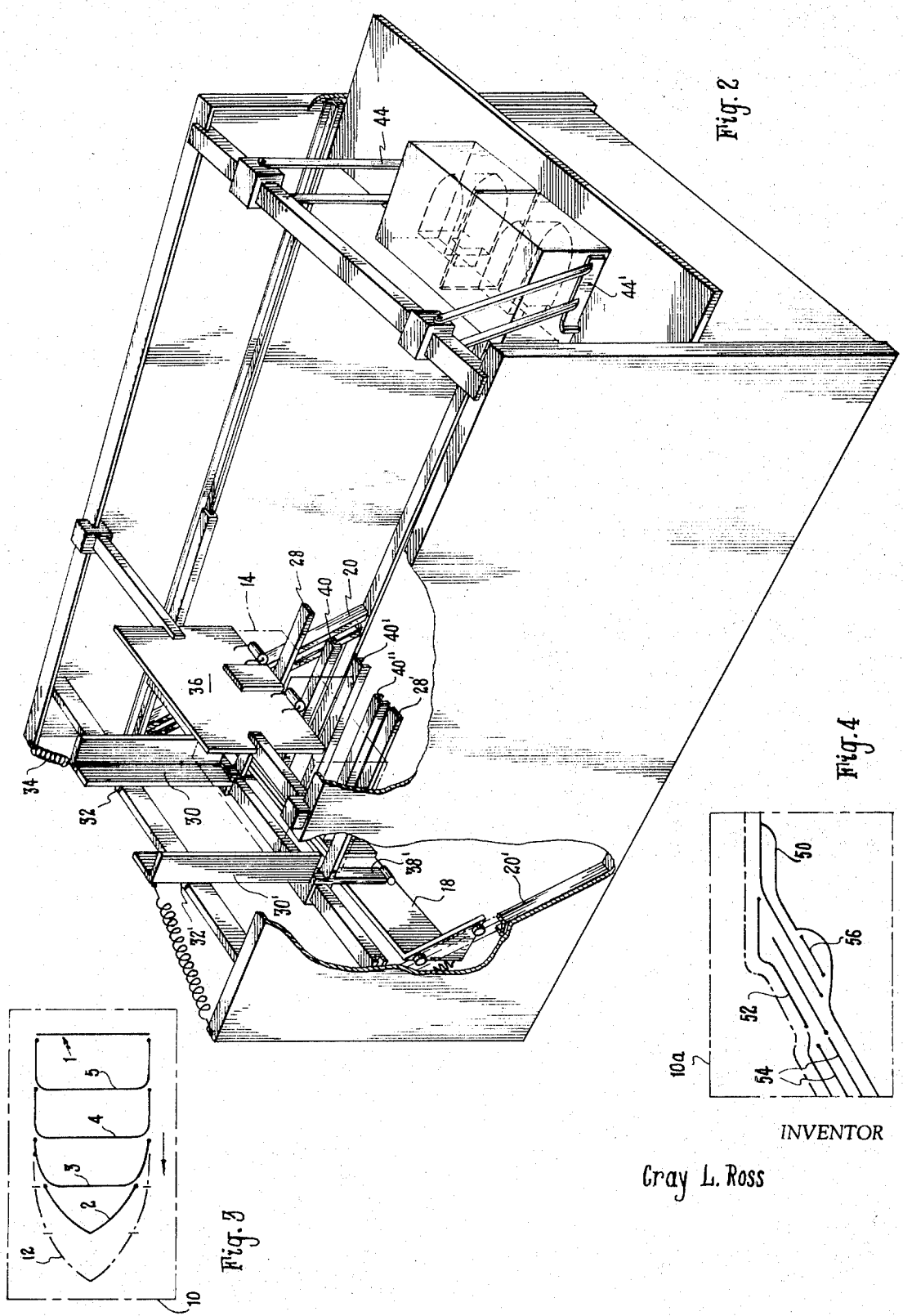

METHOD AND A MACHINE FOR CUTTING OPEN ENDED OR BLIND CAVITIES

It has become usual in packing merchandise for shipment to provide a cushioning material to absorb blows to which the shipping container may be subjected. The function of this material is to distribute the stresses from such blows to the entire surface of the merchandise to be protected by the packing in order to prevent damage thereto. One of the materials used for this purpose is foamed polystyrene which is molded into shape to fit the merchandise to be shipped, such as typewriters and electronic assemblies. Such molded packing elements, however, require expensive molds which must be used in the manufacturing where the material is made, and, because of the expense of the molds and the cost of manufacture, such molded packing elements are only feasible economically when the merchandise is very valuable and a great many elements are required.

It is an object of the present invention to make packing elements of foamed polystyrene, or the like, in an inexpensive manner so that such packing elements may be used to pack inexpensive, though delicate merchandise, and which can be used where only a limited number of such elements are required.

It is a further object of the present invention to provide a method, and a machine, to perform the method of cutting cavities in preformed polystyrene foam blocks, the cavities to be shaped to accurately fit merchandise to be packed.

It is a still further object of this invention to use a die, or dies formed of wire which is heated to cut cavities of the desired shapes in blocks of polystyrene foam.

Other and further objects and advantages will appear from the following specification taken with the accompanying drawings in which like reference characters refer to similar parts in the several views and in which:

FIG. 1 is a section through a machine for performing the method;

FIG. 2 is an exploded partly broken away perspective of the machine of FIG. 1;

FIG. 3 is a view showing diagramatically a die used to cut a cavity to receive a flat iron;

FIG. 4 is a view similar to FIG. 3 showing diagramatically a die to cut a cavity to hold a gun.

FIG. 5 is a perspective view of a die cartridge;

FIG. 6 shows the finished block of material in perspective as delivered from the machine using the die of FIG. 5; and FIG. 7 shows in perspective the block of FIG. 6 with the cavities uppermost.

Polystyrene foam is a common article of commerce and may be purchased in many shapes and sizes. Blocks of this material are used by florists to support floral arrangements; and blocks of this material are used in the building industry. It is common in using of such blocks to cut them by use of a heated wire much as lumber is cut with a jig-saw. Insulating covers for pipes have also been made by cutting the blocks of material with heated wires.

It has not, however, been possible by known methods and machines to cut "blind" cavities that are not bounded by a surface of revolution.

It will be clear that the blind cavity to accurately fit a flatiron, such as indicated in FIGS. 6 and 7, is not a cavity including a surface of revolution, nor can it be cut by a heated wire used as a jig-saw. Similarly, the cavity to fit the lock, stock and barrel of a gun, as cut by the die seen in FIG. 4, cannot be cut by any previously known method or means.

The cavity of FIG. 4 will require the material at the gun stock to be cut away to form a relatively wide but shallow cavity at that location, and the cavity at the breech of, for instance, a double barreled shotgun, must be cut deeper, while the cavity under the wooden hand rest forward of the trigger guard will need to be shallower than the cavity to receive the gun barrel which will need to be relatively deep and narrow, and the cavity to receive the trigger guard will be wide but quite shallow.

For purposes of simplicity, the method and the machine for performing the method of cutting such cavities is illustrated in connection with use of a die similar to that of FIG. 3, cutting two cavities simultaneously.

It will be understood that the die to cut the recess shown in FIG. 3 will be made of one or more pieces of wire as required. The wire or wires, however, must have a shape such that the generally vertical entering cut will cut a shape corresponding to one side of the desired recess at its desired location when the die is pressed into the material, and the wire defining the other side of the desired recess will be positioned at a distance from the first wire less than the width of the desired recess.

Portion 1 of the die in FIG. 3 is straight, as the heel of the flatiron to be packed is straight. The portion 2 of the die is appropriately pointed to agree with the shape of the point of the flatiron. The distance from portion 1 to portion 2 of the die is less than the length of the iron. Cross wires 3, 4 and 5 are shown. In the die for a flatiron, the bottom of the iron being flat, the portion of the die forming the periphery, and the cross wires will all lie in a common plane. The heated wire die is pressed vertically into the block 10 of material in the position shown in solid lines in FIG. 3, then moved laterally paralled to the sides of the block of material to the position shown in dotted lines at 12, then pulled out of the block. In doing this, wire portion 2 having moved down with wires 1, 3, 4, 5, undercuts a portion of the material as it is moved laterally, and, when portion 2 is pulled out of the material, a cavity is left and the material between the kerf cut by insertion of and withdrawal of portion 2 may be removed. Meanwhile, however, wire portion 3 has been moved as far as portion 2 was moved, which distance is preferably the distance between the point of portion 2 and the portion 3. Similarly, portion 4, 5 and 1 of the die are spaced from each other the distance corresponding to the distance the die is moved laterally within the block of material so each wire undercuts a portion of the material to be removed.

Referring now to FIGS. 1 and 2, a stack of blocks 14 of material is placed in a hopper 15. A replaceable die cartridge 16 including a frame as seen in FIG. 5 is provided. A different cartridge having wires 50, 52, 54 and 56, as an instance, as seen in FIG. 4 will be provided when a recess having a different shape is to be cut. This cartridge 16 is normally supported on a slide or carriage 18 that is restrained to move on sloping tracks 20, 20′, one at each side of the machine. This slide 18 is biased by a spring 22 to return it to its full line position in FIG. 1 when the pusher element 24 is in its starting or retracted position seen in solid lines in FIG. 1.

As seen in FIG. 5, the die cartridge for frame 16 includes a vertical element 26 that is bolted, or otherwise secured to slide 18.

Pusher 24 includes two horizontal elements 28 and 28' onto which each block of material 14 may descend in sequence as the pusher returns to its starting position.

The back of the hopper 15 is made, preferably, of two laterally adjustable corner elements 30 and 30' that are hinged at 32 and 32' so that the lower edge of the back being biased forwardly, as by a spring 34, will grip the block of material at the level of the lowest part of the hopper. As the pusher 24 is moved back to the starting position it contacts the back of the hopper and moves it back slightly so that the block of material that was being held between the biased hopper-back and the front 36 of the hopper is released, whereupon the block of material will descend vertically onto the hot die wires that extend upwardly above the level of the tops of elements 28 and 28' that support the block of material as the cavity is being cut.

On pusher 24 are two vertically disposed paddles 38, 38', that, in the starting position as seen in full lines in FIG. 1, are in front of, or to the right of, the vertical portion of slide 18.

Die frame or cartridge 16 includes as many support elements as required. Three such support elements 40, 40' and 40'' are shown in FIGS. 5 and 2. On each of support elements 40 and 40'' cam elements 42 and 42' are seen that are spaced from the vertical element 26 of the die frame in the direction of motion of the pusher 24. Paddles 38 and 38' are positioned between plate 26 and cam elements 42 and 42' respectively.

It will be seen, therefore, that as the pusher 24 is moved forward to move block 14, to the right in FIGS. 1 and 2, after a block of material has descended onto the hot wire die as seen in FIG. 1 in solid lines, the paddles 38 and 38' will not be in engagement with the die carriage 18, nor with the cam elements 42, 42' so the die will remain in place while the hot wires, similar to wires 1, 2, 3, 4, 5 of FIG. 3, cut horizontally through the material of block 14 as it is advanced toward the right. When the paddles 38, 38' contact the cam elements 42, 42', the die carriage or slide 18 will be moved to the right, or forwardly, at the same speed as the block advances, but, due to the inclination of the tracks 20, 20' the die frame or cartridge 16 including the die will be moved vertically downwardly with respect to the block of material so that the die wires will be withdrawn vertically therefrom.

When the die carriage has moved downwardly sufficiently to clear the bottom of the block of material, the formation of the cavity is complete and the die need not be moved further down. The lower end of paddles 38, 38' will then move over the horizontal portions of cam elements 42, 42'. The lower ends of paddles 38, 38' may be provided with rollers to reduce friction.

As the block 14, seen in FIG. 6, is moved to the right as seen in FIG. 1 in dot dash line, the waste material 14a will fall out. This material will not be an integral block but will be in several pieces since each hot wire of the die cuts both in entering and in being extracted from the block of material.

As the block of material 14, as seen in dot dash lines in FIG. 1, is pushed to the end of the travel of pusher 24, it is pushed between spring biased grippers 44 and 44', which are mounted to slide from a position to receive the finished block of material as seen in full lines in FIG. 1 to a delivery position seen in dot dash lines in FIG. 1, and in full lines in FIG. 2. Means to operate the gripper in timed relation to the movement of pusher 24 is not shown as it may be any known means or mechanical movement that accomplished that result.

The die shown in FIGS. 1, 2 and 5 cuts two cavities each to receive a flatiron. Each cavity is cut by a wire die portion similar to that shown diagrammatically in FIG. 3, but cutting a slightly different contour. It will be noted, too, that the parts of the block in which the two cavities are cut simultaneously are made to be readily severable by a hot wire 46 that lies between the die portions that cut each cavity. If it is desired to handle the finished block 14, FIGS. 6 and 7 as a unit the cut 48 cut by wire 46 will not cut entirely through block 14 as the block descends on the die at the starting position seen in solid lines in FIG. 1. It is evident, however, that the wire 46 may extend upwardly so as to completely sever the two portions of block 14, which will result in two seperate blocks being delivered to grippers 44, 44'.

The desired cavity cut by a die may require cutting entirely through the block 14 at some point to make a hole which may, of course, be provided for by having the wire to cut the hole in the top surface of block 14 extend upwardly a sufficient distance to pierce the top surface of the block. This will not damage the next successive block to be cut as the wire cutting the hole will be withdrawn vertically from the very position it will have in entering the next successive block, when it is released by movement of hopper back 30, 30', to descend on the hot wire die.

The cavity suggested by FIG. 4 is not only unsymmetrical, but must have parts of different depths.

Parts of the cavity to accommodate the lock, stock and barrel of the shotgun must be deeper than other parts, and some parts wider than other parts, yet the entire cavity is to be cut by the same machine using the same method as described above. The die in this case, as with the die of FIG. 3, has one wire part 50 to form one side of the cavity and a second part 52 to form the other side of the cavity the distance between wire part 50 and 52 being less than the width of the completed cavity by the distance the die is to be moved laterally to undercut the material. Since the width of the cavity to accommodate the gunstock is great compared with the distance the die is to be moved through the material, several additional die parts 54 will be required between the two outermost die parts 50 and 52. Similarly, one or more die parts 56 may be required to assure severance of all of the material from the area to accommodate the trigger guard. The wire parts to cut the recess to accommodate the trigger guard will not project as far above the support elements 28, 28' as the wire part to accommodate the breach of the shot gun will need to, as the breech is the part requiring the deepest recess. It will be noted that the die part to cut the recess to accommodate the barrel of the gun may be a single wire that defines both sides of the recess if the width of the barrel corresponds to the distance the die is to be moved laterally as it undercuts the material to be removed from the recess.

Vertical wires that both support the cutting wires, and themselves cut the waste material vertically, may be provided as required and, it will be noted, that the waste cut from the block 14 in FIG. 1 will fall out of the cavity-being-cut as the block is moved by grippers 44, 44'.

Pusher 24 may be adjustable laterally to accommodate different width dies.

It is possible too, if it is desired to have the heated wires of the die move within the block of material at an angle to the sides of the block, to provide a hopper 15 set at an angle to the machine, and to provide a pusher 24 to engage the corner or to contact two sides of the block.

The means by which the die is supported so as to move vertically downwardly with respect to the block of material being cut my be, for instance, a four bar linkage, one bar of which is the carriage that supports the die and the opposite link of which is a portion of the frame of the machine.

Having this disclosed the method and machine of the invention,

I claim:

1. A method of making shaped cavities in a block of material comprising the steps of forming a die of wire to be heated, the die being bounded on one side by at least one wire defining the shape of one side of the cavity to be cut, and bounded on the other side by at least one wire defining the shape of the other side of the cavity to be cut, said wires being spaced apart, a distance less than the width of the cavity to be cut, heating said die and pressing it into a block of packing material, moving said die laterally while it is within said material the distance by which the spacing of said wires is less than the width of the cavity to be cut, and withdrawing said die from said material.

2. A machine for cutting shaped cavities in a block of material comprising: a hopper to receive a plurality of blocks of packing material, a die cartridge, a frame normally having its upper surface forming the bottom of said hopper and a wire die extending upwardly above said frame, means to heat said wire die, pusher means at the bottom of said hopper operatively arranged to push a block of material resting on said frame laterally out of said hopper, and means operated by said pusher means to lower said die cartridge after a block of said material has been pushed a predetermined distance with respect to said die.

3. The machine of claim 2, in which said die cartridge is supported on a carriage and a means is mounted on said pusher to push said carriage in the direction of motion of said block of material so that, under the action of the carriage said die will be lowered with respect to said block of material so that said die will be withdrawn from said block of material.

4. The machine of claim 3, in which said carriage is mounted on a trackway that slopes downwardly in the direction of motion of said block of material.

5. The machine of claim 2, in which means is provided to hold the next successive block of material to prevent its further descent in the hopper until said pusher means is returned to its original position.

6. The machine of claim 2, in which one side of said hopper is biased inwardly so as to support blocks of material within said hopper.

* * * * *